Figure 1:
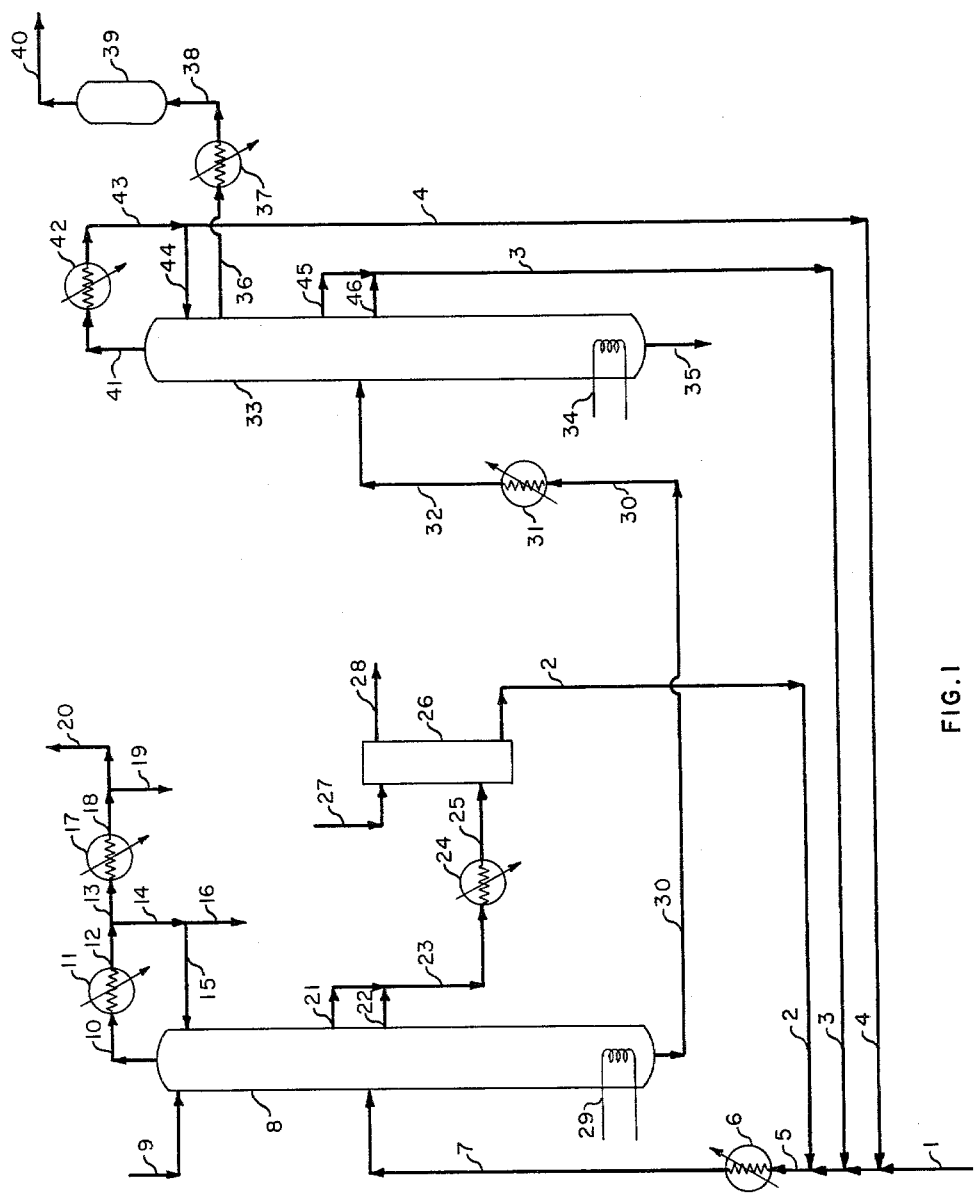

RAPHAEL KATZEN
INVENTOR.

Jan. 18, 1966

R. KATZEN 3,230,156

PURIFICATION OF SYNTHETIC METHANOL BY PLURAL
STAGE DISTILLATION

Filed Sept. 8, 1961

RAPHAEL KATZEN
INVENTOR.

BY J. T. Chaloty
AGENT

United States Patent Office 3,230,156
Patented Jan. 18, 1966

3,230,156
PURIFICATION OF SYNTHETIC METHANOL BY PLURAL STAGE DISTILLATION
Raphael Katzen, Cincinnati, Ohio, assignor to Chemical Construction Corporation, New York, N.Y., a corporation of Delaware
Filed Sept. 8, 1961, Ser. No. 136,858
16 Claims. (Cl. 203—37)

This invention relates to the purification of crude synthetic methanol, by means of a new and improved process which utilizes a sequence and combination of distillation, extraction and adsorption procedures to achieve the production of highly purified methanol in a more efficient and economical manner.

Crude synthetic methanol may be produced by a variety of processes, but is principally obtained by catalytic synthesis from carbon monoxide and hydrogen, or by the partial oxidation of hydrocarbons. The crude material will always contain small amounts of by-product organic compounds, such as higher alcohols, ethers, ketones and aldehydes. These organic by-products are usually removed or separated from the methanol by procedures including distillation or a sequence of distillation steps. One major approach of the prior art, as shown in U.S. Patent No. 2,549,290 and Great Britain Patent No. 660,773, involves the concept of extractive distillation whereby the crude methanol is distilled together with a large proportion of water. The presence of the water component in the system upsets the normal volatilities of the various components, and as a result the components having normal boiling points above that of methanol (high boilers) are distilled overhead together with lower boiling components (low boilers). Thus, a bottoms stream of dilute aqueous methanol is produced, and this stream is subsequently rectified in a conventional manner to separate the methanol from the water.

An early and somewhat more conventional approach to methanol purification involved a first distillation step in which a limited amount of water is added to the distillation zone. In this case, low boilers are removed overhead with the added water serving to provide a sharper separation. The bottoms stream, consisting of aqueous methanol together with high boilers, is then re-distilled to produce an overhead vapor stream of purified methanol. In this sequence, the final bottoms stream must be re-distilled in order to recover a methanol-rich fraction which is then recycled.

These process sequences of the prior art have been widely employed in commercial facilities, and have been accepted as standard process techniques in methanol purification. However, there are various aspects of these processes which result in limited purification efficiency, in terms of energy consumption and apparatus cost. Thus, where the high boilers are removed overhead by extractive distillation as described in the patents cited supra, it is necessary to add a large proportion of water in order to achieve the volatilization of the high boilers relative to the methanol. In this case, the subsequent separation of methanol from the diluted aqueous solution requires a relatively large amount of heat. The conventional sequence involving separate removal of low and high boilers is also objectionable, since a clean separation is not achieved and auxiliary distillation is required.

In the present invention, the purification of crude synthetic methanol is accomplished in an improved manner, by means of a process which embodies several novel concepts. The crude feed stream is passed into the central section of a first distillation zone. The concentration of high boilers in the liquid phase of this section is maintained at a level considerably above that of the incoming feed, for reasons which will appear infra. A limited amount of water is passed into the upper portion of the distillation zone, so as to provide an overhead vapor stream consisting of low boilers together with a relatively small amount of high boilers, methanol, and water. A side stream is also withdrawn from the central region. This side stream will preferably be obtained from the liquid phase in the central region, however, it should be understood that vapor may also be withdrawn from the central region and externally condensed. In any case, the liquid side stream is then cooled and diluted with water. This decreases the solubility of high boilers, and separation of a layer of high boilers from the aqueous methanol phase is obtained. The layer of high boilers is removed by decantation or other means, and the diluted aqueous phase is recycled to the distillation zone. It will be understood that the concentration of high boilers in the middle section must be maintained at a sufficiently high level, in order that the dilution with water will result in the formation of a separate layer of high boilers suitable for decantation.

Thus, the first distillation zone in the present invention is maintained with a central section having a concentration of high boilers which is higher than that of the crude feed. The upper water feed serves to assist in holding this concentration of high boilers at the central section, by alteration of relative volatilities. Consequently, a bottoms stream is obtained from this first zone which consists primarily of aqueous purified methanol solution, having only a very slight concentration of high boilers together with trace amounts of low boilers. This bottoms stream is then stripped and rectified in a second distillation zone, primarily in order to separate water from the purified methanol.

However, certain unique concepts are also embodied in the purification by rectification which takes place in this second zone. It should be understood that these concepts will also apply to the rectification of purified aqueous methanol solution derived from other processes such as the extractive distillation processes described in patents cited supra. The bottoms stream from the first zone is passed into the central section of the second zone. In the present invention, it has been found that residual high boilers may be concentrated in the second zone, and thus a side purge stream containing small residual amounts of high boilers is withdrawn from the central section of the second zone and recycled to the first distillation zone. In addition, the product drawoff from the second zone does not consist of the overhead vapor stream, but instead the product stream is derived from a liquid phase in an upper region but below the top of the second zone and not in equilibrium with the overhead vapor stream. The overhead vapor stream thus contains residual trace amounts of low boilers, and is condensed and partially recycled to the first distillation zone. The balance of the overhead stream is refluxed to the top of the second zone.

In a preferred embodiment of the present invention, improved overall heat economy is achieved in a novel manner. The second distillation zone is maintained at an elevated pressure, and the overhead vapor phase from this zone is utilized as a heat source for the purpose of heating the first zone. Thus, the overhead vapor is passed in heat exchange with the bottoms solution in the reboiler section of the first zone. The bottoms are reboiled, which provides vapor in the first distillation zone. Concomitantly, the overhead vapor is condensed, and is then refluxed to the second zone. This embodiment of the present invention results in a substantial decrease of about one-third in total thermal energy requirements, although equipment cost is increased slightly.

The overall sequence of process steps of the present invention provides numerous advantages. A very high purity anhydrous methanol is produced, with a minimum consumption of energy in the form of steam or other heating medium. In addition, a very high proportion of the methanol in the feed, at least 98% or more, is recovered as high grade product. A minimum of process equipment is required, consisting of only two distillation towers and their auxiliaries including a small extractor-decanter for separation of high boilers from the first tower side-stream.

Thus, the process of the present invention permits the production of very high grade synthetic methanol with new quality standards. Furthermore, this product is attained with minimum investment and production costs. Some existing units can be converted to this novel operation by modification and addition of equipment. New installations will utilize more completely the unique combination of advantages of high quality, high recovery, low investment and low operating cost which are achieved by this novel process.

It is an object of the present invention to purify crude synthetic methanol.

Another object is to remove the major portion of high boiling and low boiling organic impurities from crude synthetic methanol by means of an improved extractive distillation procedure.

A further object is to produce pure anyhdrous methanol from partially purified dilute aqueous methanol derived from an extractive distillation process.

An additional object is to substantially completely recover the methanol component in crude synthetic methanol as pure anyhdrous methanol.

Still another object is to eliminate high boiling components from crude synthetic methanol by maintenance of a distillation zone having a methanol phase sufficiently rich in said components, that dilution with water causes separation of said components from the methanol phase.

Still a further object is to purify methanol by a two-stage distillation process having improved heat economy, in which the second stage is maintained at elevated pressure so as to provide a heat source for the first stage.

These and other objects and advantages of the present invention will become evident from the description which follows. In this description, preferable operating ranges of process variables will be pointed out or suggested for most process streams. It should be understood that these ranges are intended merely to serve to distinctly point out to those skilled in the art the operating ranges which comprise the best mode of carrying out the invention. Since these ranges are not critical, the invention is not intended to be so limited but instead comprehends and extends to the full range of equivalent operation conditions which could serve to produce the same results by means of the same combination of process steps as broadly defined in the claims.

Referring to the FIGURE 1, a generalized exposition of the main features of the invention is presented. A feed stream of crude synthetic methanol is passed into the process via 1. Stream 1 is typically produced by a high pressure process of synthesis wherein a mixed hydrogen-carbon monoxide gas stream is catalytically converted to methanol. Various by-products including water, ethers, esters, aldehydes and ketones are also formed during the synthesis. Thus, stream 1 will typically contain about 85% methanol, 10% water, 2% dimethyl ether, and smaller amounts of other organic impurities. All proportions or compositions specified are by weight percent. The organic impurities may be roughly divided into two groups, "high boilers" and "low boilers," depending on whether the specific compound has a normal boiling point above or below that of methanol. As discussed in detail in British Patent No. 660,773 cited supra, due to the presence of water and other factors the volatilities of the various components are altered so as to make impossible the complete separation of the organic impurities from the methanol by conventional distillation.

Stream 1 is preferably combined with recycle streams 2, 3 and 4 derived from within the process. The combined stream 5 is heated in heat exchanger 6 to a temperature usually in the range of 160° F. to 200° F., and is then passed via 7 to the central section or middle region of a first distillation zone in unit 8. Unit 8 may consist of any convenient apparatus for carrying out a distillation process, such as a tower provided with packing, bubble cap trays, or perforated trays. It should be noted that in practice the recycle streams 2, 3 and 4 may be separately passed into unit 8 at suitable points, but that these streams will preferably be combined with stream 1 as shown in FIGURE 1. Additionally, stream 7 may be split and fed into unit 8 at two or more points so as to provide more uniform operation of the central section. A portion of stream 7 may be passed into unit 8 above the central section, so as to alter volatilities and thereby improve the separation of high boilers in the central section, as will appear infra.

Unit 8 is operated so as to maintain a liquid phase in the central section with a proportion of high boilers above that of the incoming feed. Thus, the liquid phase in the central section of unit 8 preferably will have a concentration of high boilers relative to methanol in the proportion of 50% to 200%. It is necessary to maintain a concentration of high boilers in the central section which is at a level where subsequent external dilution with water will produce a partial separation of the high boilers as an insoluble phase. A feed stream of extractive distillation water is passed into unit 8 via 9, at a temperature below that of stream 7 and preferably in the range of 85° F. to 125° F. Water stream 9 is also preferably slightly alkaline in pH, thus sodium hydroxide or other typical alkali agent is added to stream 9, in order to maintain the system at an alkaline pH, preferably in the range of 7.5 to 9.5. This is done in order to liberate ammonia which may be present in the crude feed from any chemical combination, so that the free ammonia will be volatilized and pass from the system in the overhead vapor stream 10. In addition, an alkaline pH ties up any carboxylic acid which may be present in the form of the equivalent acid salt, which is water-soluble and thus is readily removed from the system in purge water. It should be understood that use of an additive to maintain an alkaline pH may not be necessary in some cases, and further that the alkaline agent, when employed, may be added to the other process streams besides water stream 9.

The water stream 9 thus passes downwards through unit 8, and is partially vaporized. In addition, the water dilutes the liquid phase in unit 8, and consequently a distillation of low boilers and partial extractive distillation of high boilers takes place in the upper portion of unit 8, roughly between feed inlet 7 and upper water inlet 9. As a result, the overhead vapor stream 10 removed from the top of unit 8 contains practically all of the low boilers, a minor portion of the high boilers, and a moderate amount of methanol and water vapor. Stream 10 is partially cooled in unit 11, and the cooled stream 12 is separated into residual vapor phase 13 and condensed liquid component 14. Stream 14 is partially refluxed via 15 and the balance, stream 16, containing a portion of the low boilers and high boilers together with a small amount of methanol and water, is discarded. Reflux stream 15 will usually be admitted into unit 8 at a level equal to or below that of water feed 9, in order to produce vapor stream 10 with maximum impurity content. Residual vapor stream 13 is either discharged, or may be further cooled in cooler 17 to a lower temperature level at which dimethyl ether is condensed. In this case, the resulting stream 18 is separated into by-product dimethyl ether cut 19 and residual vapor stream 20 which is discarded.

Returning now to distillation unit 8, a side stream or streams, shown as 21 and 22, are drawn off from the central section. These side streams will contain the high concentrations of high boilers relative to methanol as indicated supra. It would be possible to operate with only a single drawoff, however, it is preferable to provide two separate drawoffs, as shown on the figure, with streams 21 and 22 being disposed respectively above and below inlet stream 7. The reason for this is that the high boilers will generally concentrate at two levels or "pinch points" rather than one, with C-3 and C-4 compounds predominating in stream 21 and C-5 and C-6 compounds concentrating in stream 22. In some cases it may be most effective to provide 3 or more individual side draws from the central section. Preferably, the side draws are derived from the liquid phase in the central section. However, it should be noted that vapor draws could be employed, with the vapors condensed before extraction and decantation, but in this case the resulting condensed liquid stream would be of a less decantable composition.

The separate side draw streams 21 and 22 are combined to form stream 23 which usually will have a concentration of high boilers relative to methanol in the proportion of 50% to 200%. Typically, stream 23 will contain about 25% metanol, 25% high boilers and 50% water. Stream 23 is first cooled in cooler 24, preferably to a temperature in the range of 75° F. to 140° F., in order to facilitate subsequent separation of high boilers. The resulting stream 25 is now extracted with water, in order to separate water-soluble methanol from water insoluble high boilers. As a result of the dilution, a portion of the high boilers will become less soluble and will separate out to form a distinct oily organic layer above the main aqueous methanol phase. This procedure is preferably carried out in apparatus such as extractor-decanter unit 26, which is provided with internal means such as packing in order to attain liquid mixing and complete equilibrium. Dilution water is passed into unit 26 via 27, and mixed with stream 25 so as to produce a final water concentration in outlet stream 2 usually in the range of 50% to 90%. Thus, the typical inlet composition of stream 23 described supra as being 25% methanol, 25% high boilers and 50% water will be altered to a final composition of outlet stream 2 which is typically about 15% methanol, 15% high boilers and 70% water. In addition, the ratio of high boilers to methanol is decreased slightly, due to separation of a portion of the high boilers into an upper water-immiscible organic layer which is withdrawn via 28 by decantation or other means and discarded. Stream 2 is recycled to the process as described supra.

Returning now to unit 8, the lower section of the unit is maintained with a fairly constant ratio of water to methanol in the liquid phase. The ratio of high boilers to methanol decreases sharply from the proportion maintained in the central section, to a final extremely low value in the bottom of unit 8. Thus, the lower section of unit 8 serves in effect to strip high boilers from aqueous methanol solution. The distillation effect in unit 8 is maintained by means of the conventional reboiling of bottoms, with heater coil 29 serving as a heat source for vapor generation. Thus, boiling aqueous methanol solution is maintained in the bottom of unit 8 at a temperature typically in the range of 180° F. to 20° F. Methanol content in the bottoms will vary from about 8% to 40%. Below 8% methanol solution, no further significant purification benefits are achieved by further dilution, while above 40% methanol solution certain high boiling components have relative volatilities close to that of methanol itself and thus would not move up inside unit 8.

Purified aqueous methanol solution is removed from the bottom of unit 8 via 30, and is essentially free of organic impurities. It will be understood that trace or residual amounts of organic impurity will be present in stream 30 in all cases, however, these amounts are sufficiently small that continuous purging of small recycle streams from the final purification unit in a manner to be described infra will suffice to remove substantially all residual organic impurity.

Stream 30 is now passed to a second distillation zone, in which separation of water from the purified methanol takes place by use of a rectification-stripping procedure. In addition, residual amounts of low and high boilers are also separated from the methanol-water system in the second distillation zone. Stream 30 must generally be heated prior to rectification, in order to provide maximum overall heat efficiency and optimum operating conditions. Thus, stream 30 is heated in exchanger 31, to a final temperature generally in the range of 205° F. to 220° F. The resulting heated process stream now passes via 32 into distillation zone 33, which is an apparatus unit similar to unit 8 described supra. In unit 33, separation of water from the purified methanol takes place by means of a conventional stripping and rectification type of distillation. Thus, in the lower section of unit 33, all residual methanol is stripped from the liquid water phase and passes upwards in the rising vapor phase. The liquid bottoms, consisting essentially of water together with a slight amount of residual organics and soluble salts, is reboiled by heat applied via coil 34 to provide vapor driving force for the operation of unit 33. Alternatively, direct injection of steam could be employed to provide the reboil effect. Final reboiler bottoms are withdrawn via 35 at an elevated temperature typically in the range of 215° F. to 230° F., and may be discarded after recovery of sensible heat by suitable heat exchange within the process, not shown. In some cases, particularly where water is comparatively costly, a portion of stream 35 may be recycled via 9 and re-utilized in the process.

The methanol component thus moves upwards in unit 33, and is concentrated as highly purified anhydrous product in the upper portion of the distillation zone. Product methanol is preferably not withdrawn as overhead vapor from the top of unit 33, but instead the product material is removed as a liquid phase side draw at a temperature of about 148° F. to 150° F. via 36, which is located at a point somewhat below the top of the distillation zone. The location of product removal via 36 at a point below the top of the overall distillation zone 33 allows vapor-phase concentration of residual low boilers at the top of unit 33. Final trace amounts of impurities are removed from stream 36 by cooling the highly purified methanol in cooler 37, followed by an adsorption step in which the cooled product stream 38 is passed in contact with activated carbon or other suitable agent in unit 39. The final product stream 30 may also be passed through an additional filter unit, not shown, for removal of entrained solid particles.

An overhead vapor phase 41 containing residual low boilers is withdrawn from the top of zone 33, at a temperature in the range of 145° F. to 150° F. Stream 41 is condensed in cooler 42, and the resulting liquid stream 43 is partially refluxed via 44. The balance of stream 43 is recycled via 4 to the first distillation zones. Thus a net purge of residual low boilers from zone 33 takes place.

Similarly, it has been found that residual high boilers may be successfully purged from zone 33, since buildup of high boilers takes place towards the center of unit 33. Distribution of high boilers concentration in unit 33 is similar to that in unit 8 described supra, with the formation of two "pinch points" of maximum concentration. Hence, purge streams 45 and 46, consisting of aqueous methanol together with residual high boilers derived from stream 32, are withdrawn as liquid side streams from the central section of unit 33. Streams 45 and 46 may alternatively be removed from unit 33 as a single stream, however, as discussed supra in connection with streams 21 and 22, it will usually be preferable to remove two or more individual side streams, thus providing greater selectivity in purging. Streams 45 and 46 will usually be withdrawn at temperatures in the range of 165° F. to 180° F., and these streams are preferably combined to form stream 3 which is recycled to the first distillation zone as described supra. Thus, buildup of high boilers in unit 33 is completely avoided by means of side stream purge and recycle.

Various alternatives and modifications within the scope of the present invention will occur to those skilled in the art. Thus, it should be understood that in some instances the purification which is accomplished in unit 8 may suffice to produce a purified and commercially usable aqueous methanol solution. In this case, stream 30 would be the end-product of the process and the additional subcombination of process steps embodied in unit 33 would be omitted.

Similarly, certain aspects of the present invention provide a subcombination process which could be directly applicable to an existing facility. Thus, for example, various process streams similar to stream 30, consisting of partly purified aqueous methanol solution, are presently produced by means of various processes such as those described in U.S. Patent No. 2,549,290 and British Patent No. 660,773. Such streams could readily be processed by means of the combination and sequence embodied in unit 33, in order to produce a final product stream consisting of pure anhydrous methanol in a more efficient and economical manner.

Figure 2:
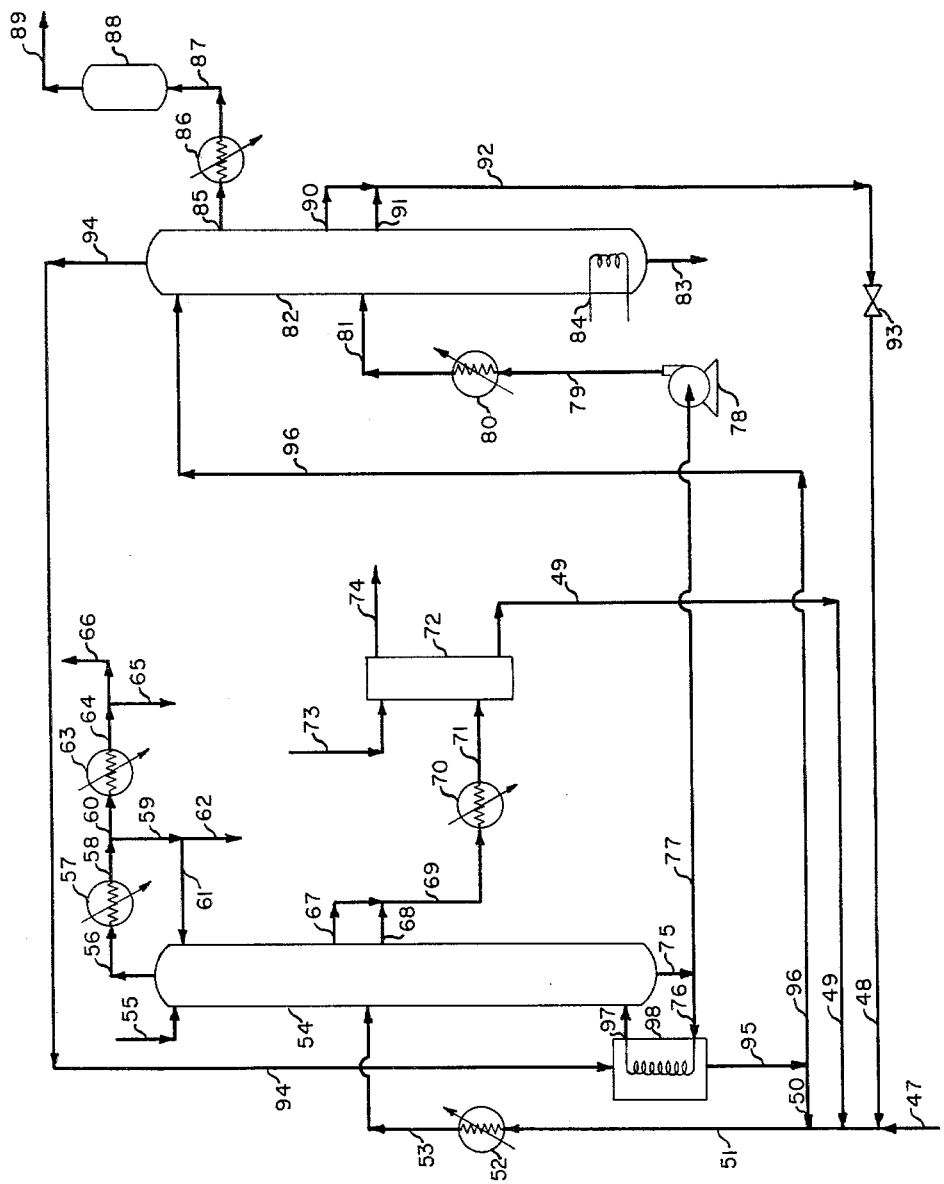

A preferred modification of the overall process combination is illustrated in FIGURE 2. In this embodiment, the rectification unit for final purification is operated at an elevated pressure, in order to generate the overhead vapor stream at a temperature which is considerably higher than in the normal case of operation at atmospheric pressure conditions. Thus, the overhead vapor stream from the rectification unit is employed as a heat source to reboil the bottoms of the extractive distillation unit. This process sequence results in considerably higher heat economy, however there is also a slight increase in equipment costs. In most cases, the heat savings will far outweigh the slightly greater initial capital cost.

Referring to FIGURE 2, crude synthetic methanol stream 47 is admitted to the process, and combined with recycle streams 48, 49 and 50 derived from within the process, to produce combined feed stream 51. Stream 51 is heated by exchanger 52, and is passed via 53 into first distillation unit 54. Process stream 53, and the operaton of unit 54, are quite similar to the corresponding stream 7 and unit 8 of FIGURE 1. Hence detailed discussion of optimum operating conditions, process ranges or process effects will not be discussed relative to unit 54, in order to avoid needless repetition. Instead, enumeration of process streams and a simplified outline of the process sequence will be provided with respect to unit 54. Details of the process and preferred operation ranges of process variables relating to unit 54, will correspond to similar items of FIGURE 1, described supra.

Thus, extractive distillation water stream 55 is passed into the upper portion of unit 54. Overhead vapor stream 56 is cooled and partially condensed in cooler 57, and the resulting stream 58 is separated into liquid phase 59 and residual vapor phase 60. Stream 59 is partially recycled via 61 to unit 54, and the balance of stream 59 is withdrawn from the process via 62. Vapor stream 60 may be discarded, or optionally stream 60 may be cooled in unit 63 to condense dimethyl ether. In this case, the resulting stream 64 is separated into liquid dimethyl ether phase 65 and residual gas phase 66 which is discarded.

Side streams 67 and 68 are withdrawn from the central section of unit 54 and combined to form stream 69 which is cooled in unit 70. The resulting cold side draw stream 71 is passed into extractor-decanter unit 72, together with dilution water stream 73. The resulting heavy boilers layer is withdrawn via 74, while the diluted aqueous methanol phase is recycled to the process via 49.

The bottoms solution in unit 54, consisting of purified aqueous methanol solution, is withdrawn via 75, and divided into stream 76 and 77. Stream 77 is passed to the final purification stage, while stream 76 is heated and partially vaporized in heat exchanger 98, which thus functions as a reboiler. The heated process stream is passed back into unit 54 via 97, to provide the heated vapor which serves as the driving force for operation of unit 54.

As mentioned supra, stream 77 is now passed to final purification, which consists of a second stage of distillation in which rectification and stripping for separation of methanol from water and final removal of organic impurities takes place at elevated pressure. Thus, stream 77, consisting of purified aqueous methanol solution at a temperature preferably of about 180° F. to 220° F. and having a methanol content in the range of 8% to 40%, is passed via pump 78 to the required elevated level of pressure, typically in the range of 20 p.s.i.g. to 170 p.s.i.g. The pressurized process stream is discharged via 79, heated in exchanger 80 to a final temperature preferably in the range of 250° F. to 355° F., and then passed via 81 into the central section of distillation zone 82. Zone 82 comprises a distillation apparatus unit similar in operation and effect to unit 33 described supra, except that a substantially elevated pressure, preferably within the range of 20 p.s.i.g. to 170 p.s.i.g., is maintained within unit 82. A bottoms stream 83 is withdrawn from the lower reboiler section of unit 82, with heat being provided by steam coils 84. Other heating medium besides steam may be employed in coils 84. It will be recognized by those skilled in the art that direct injection of steam into the bottom of unit 82 is another alternative means of heating. In any case, bottoms stream 83, consisting essentially of water together with minor residual amounts of organics and dissolved salts, is withdrawn from 82 at a temperature typically in the range of 275° to 375° F. Stream 83 is discarded, or may be partially recycled to the process via 55, after recovery of sensible heat by heat exchange with process streams, not shown.

Product methanol is withdrawn from the upper portion of unit 83 via side draw 85. Stream 85 will be at a temperature corresponding to the operating pressure in unit 83, thus typically stream 85 will be withdrawn at a temperature in the range of 190° F. to 295° F. Product stream 85, consisting of substantially pure anhydrous methanol, is cooled in unit 86, and passed via 87 to adsorption vessel 88 which is charged with activated carbon or other suitable adsorbent. Final removal of trace amounts of impurity takes place in unit 88. The final product stream 89 may be filtered, not shown, for removal of entrained solids.

Returning now to unit 82, side stream 90 and 91 containing concentrated amounts of residual high boilers are withdrawn as a purge from the central section of unit 82 and combined to form recycle stream 92, at a temperature typically in the range of 210° F. to 315° F. Stream 92 is recycled to the first distillation zone via pressure reducing valve 93 and line 48. Valve 93 serves to maintain elevated pressure in unit 82, as well as a pressure differential between the first and second distillation zones.

An overhead vapor stream 94 is withdrawn from the top of unit 82. Stream 94 corresponds to stream 41 of FIGURE 1 described supra, in that residual low boilers are removed from unit 82 in this overhead vapor. However, stream 94 performs an additional and highly significant function in this embodiment of the present invention. Since unit 82 is maintained at elevated pressure, stream 94 is withdrawn at a corresponding elevated pressure and thus is at a temperature usually in the range of 190° F. to 295° F. Therefore, stream 94 may thus be employed as a heat source and is passed into heat exchanger 98 so as to provide heat for reboiling the bottoms of unit 54. The heat of condensation present in the overhead vapor stream is thus at an available level, and is utilized in the process rather than being wasted via cooling water, as was the case with cooler 42 of FIGURE 1. Stream 94 is thus condensed in exchanger 98. The liquid condensate is removed via 95, and partially recycled via 50 to the first distillation zone to provide net recycle of the low boilers. The balance of stream 95 is refluxed via 96 to the top of unit 82.

It should be understood that various alternatives may be employed within the scope of the elevated pressure concept. Thus, in most cases the overhead vapor draw-off required for optimum operation of unit 82 will be somewhat greater than the vapor input flow required for operation of heat exchanger 98. Thus, only a portion of the overhead vapor from unit 82 may be employed in unit 98, with the balance of the vapor being separately condensed and refluxed in a conventional manner.

As pressure is increased, with respect to the methanol-water system, the relative volatility of methanol decreases with respect to water. Thus, if all other factors remain constant, it will be found that the optimum concentration of methanol in the partially purified aqueous bottoms derived from the extractive distillation zone is higher when the elevated pressure alternate is adopted.

Examples of typical specific industrial application of the process of the present invention will now be described.

*Example I*

A crude synthetic methanol stream to be purified in accordance with the present invention was obtained from a synthesis facility at 30 p.s.i.g. and 70° F. Crude feed rate was 44.3 g.p.m. (gallons per minute), and the feed stream had an average analysis of 833% methanol, 13.9% water, and 2.8% organics. The organics component was mostly dimethyl ether, however, other organic byproducts such as isobutanol, diethyl ether, ethanol, acetone and n-amyl alcohol were also present in measurable proportions. Trace amounts of other alcohols and aldehydes were also present. The crude material had a distillation range as follows:

| | Percent |
|---|---|
| Below 64° C. | 7.75 |
| 64–65° C. | 82.03 |
| 66–99° C. | 1.12 |
| 99–100° C. | 13.21 |
| Above 100° C. | 0.0 |

The crude feed stream was heated and combined with process recycle streams to form a total feed to the extractive distillation unit consisting of 50 g.p.m. at 15 p.s.i.g. and 175° F. Water feed to the top of the unit was 66.7 g.p.m. at 100° F. The overhead vapor stream was removed at 170° F. and 0 p.s.i.g., and analyzed 27.6% methanol, 56.5% water and 15.9% organics. This organics component included practically all of the low boilers together with about 10% of the total input of high boilers.

The overhead vapor was condensed and refluxed at 170° F. Reflux rate was 17.1 g.p.m., and the return stream analyzed 29.1% methanol, 59.7% water and 11.2% organics. Thus, based on material balance, net overhead removal was about 1.8 g.p.m. Of this net removal, about 0.3 g.p.m. was withdrawn as purge of liquid condensate at 170° F. The residual overhead vapor stream was further cooled to −10° F. to condense a dimethyl ether fraction at the rate of 1.2 g.p.m. Final residual vapor was vented.

Side streams were withdrawn from the liquid phase in the central section of the extractive distillation unit. One stream was withdrawn at 2 p.s.i.g. and 180° F. from a point above the feed inlet, at a rate of 1 g.p.m. This stream contained about 50% water, 25% methanol and 25% organics. The organics component consisted primarily of high boilers in the $C_2$ to $C_4$ range. A similar stream was withdrawn from a point below the feed inlet at a rate of 2 g.p.m., in this case the organics component consisted primarily of high boilers in the $C_4$ to $C_6$ range. Both streams also contained a small proportion of low boilers, principally dimethyl ether. The side streams were combined, cooled to 100° F., and passed at 10 p.s.i.g. into the extractor decanter. A dilution stream of water was passed into the upper part of the extractor decanter at 85° F. and 20 p.s.i.g., at a rate of 1.5 g.p.m. A separator layer of insoluble crude high boilers was thus formed, and was withdrawn from the top of the decanter at 100° F. High boilers removal rate was 0.2 g.p.m. The balance of the combined and diluted side streams, now consisting of about 70% water, 15% methanol and 15% organics at 100° F. was added to the crude feed stream and thus recycled to the process.

The liquid bottoms solution was reboiled at 5 p.s.i.g. and 194° F. in the lower end of the extractive distillation column. This solution consisted of substantially pure aqueous methanol solution of about 30% methanol content, containing only small residual amounts of high boilers and trace concentration of low boilers. Gauge pressures above atmospheric were generated and maintained as specified in the lower and central sections of the column, in order to maintain vapor pressure head and thus to produce the required distillation effect. It will be evident to those skilled in the art that the same effects could readily be achieved by the maintenance of a vacuum condition at the upper end of the column. In this case, atmospheric or sub-atmospheric pressure levels and comparable temperature conditions would exist within the column. Such a system achieves greater heat utilization, however, maintenance of vacuum in the column naturally requires more equipment and greater capital costs.

The purified 30% aqueous methanol solution was withdrawn at a rate of 117 g.p.m. from the bottom of the extractive distillation unit, and passed to the rectification-stripping unit for water removal and final purification. The stream was first heated to 210° F., and then passed into the central section of the rectification unit at 10 p.s.i.g. Residual amounts of high boilers were concentrated and withdrawn as two side draw-off purge streams from the central section of the rectification unit, above and below the feed inlet. Each side draw purge stream was withdrawn at 170° F. and 5 p.s.i.g., at a rate of 0.7 g.p.m. These streams contained about equal proportions of methanol and water, together with less than 1% high boilers. The streams were combined and recycled to the process by addition to the crude feed stream.

The bottoms in the rectification unit, consisting essentially of water together with dissolved salts and a very minor residual concentration of organics, was reboiled at 233° F. and 7 p.s.i.g. As discussed supra with respect to the extractive distillation unit, gauge pressure head was obviously required in order to maintain vapor rise. Bottoms water was removed from the system at a rate of 76 g.p.m. and partially cooled by heat exchange with the incoming feed stream of partially purified 30% methanol solution. The bottoms water was further cooled, and a major portion of the stream was then recycled to the top of the extractive distillation column to provide feed water for the unit as described supra. The balance was discarded.

A liquid side stream of substantially pure anhydrous methanol product was withdrawn at about 148° F. from an upper level of the column, somewhat below the top, and cooled to 100° F. The stream was passed through activated carbon adsorbers for removal of trace impurities, and then through a filter for removal of entrained solids. This final highly purified methanol product was produced at a rate of 39 g.p.m. Total methanol loss in the process, based on material balance, was only 1.5%. The final refined methanol product uniformly met the following specifications for the highest grade refined methanol.

| | |
|---|---|
| Distillation range (ASTM-268) | 1° C. Max. |
| Non-volatile content | 0.001% Max. |
| Acetone | 0.003% Max. |
| Acidity (as acetic) | 0.003% Max. |
| Color A.P.H.A. | 5 Max. |
| Odor | Free from foreign odor. |
| Permanganate test at 15° C. | 1 hr. Minimum. |
| Purity | 99.85%. |
| Hydrocarbon | None. |
| Organic sulfur | 1 p.p.m. Max. |
| Inorganic | None. |
| Alkalinity | Not alkaline to phenolphthalein. |
| Acid wash | Not darker than 0.000125 N Iodine Solution. |
| Sp. gr. 20°/20° | 0.7930 Max. |
| Water content | 0.05%. |

An overhead vapor stream consisting of methanol together with minor residual amounts of low boilers was withdrawn from the top of the rectification unit at 148° F. and substantially atmospheric pressure. This vapor stream was condensed and recycled to the top of the unit at almost total reflux, with a reflux rate of 101 g.p.m. A 0.5 g.p.m. purge stream of this condensate was recycled and combined with the crude feed to extractive distillation, in order to purge low boilers from the rectification system.

*Example II*

A methanol purification system was designed for operation in a manner similar to Example I, except that the rectification section was operated at elevated pressure and the overhead vapor stream was condensed in heat exchange with the bottoms of the extractive distillation column, and thus served to reboil the bottoms.

The extractive distillation unit was operated with process conditions substantially identical with those described supra in Example I, except that the water feed rate to the top of the unit was reduced to 57.2 g.p.m. Since the methanol throughput rate was the same as in Example I, the purified aqueous methanol bottoms solution was of 33% methanol strength and was withdrawn at 194° F. and at the rate of 107 g.p.m. As discussed supra, at elevated pressure the volatility of methanol relative to water decreases in the methanol-water system. Thus, when rectification is to be carried out at elevated pressure, it is necessary to product a slightly more concentrated solution from the extractive distillation unit, for optimum overall operation of the process. However, it will be evident to those skilled in the art that when a stronger aqueous methanol solution is produced in the extractive distillation process, somewhat lower purification is achieved. Thus a balance between these factors and compromise conditions must be accepted in practice.

The extractive distillation bottoms solution was reboiled by heat exchange with methanol vapors derived at 222° F. from the rectification unitt in a manner to be discribed infra.

The bottoms solution of 33% methanol, withdrawn from the extractive distillation unit at 194° F., was passed to the rectification unit at a rate of 107 g.p.m. The stream was heated to 260° F. and passed at a pressure of 50 p.s.i.g. into the central section of the rectification unit, which was maintained at superatmospheric operating pressure. In other respects, the operation of the rectification unit was similar to Example I. Thus, liquid water bottoms was heated and reboiled at 300° F. and 53 p.s.i.g. Side draw purges containing high boilers were withdrawn from the rectification unit at 50 p.s.i.g. and recycled to join the crude feed to extractive distillation. The product anhydrous methanol was withdrawn from the upper section of the unit at 222° F., and processed in a manner similar to Example I before passing to product storage.

The procedure with respect to the overhead vapor stream was quite distinctively different from that of Example I. The overhead vapor was removed from the rectification unit at 222° F. and 45 p.s.i.g., and part of the vapor stream was passed in heat exchange with the liquid bottoms of the extractive distillation unit so as to condense and provide required reboil heat. The balance of the vapor stream was separately condensed in an auxiliary unit. The total condensate was refluxed to the top of the rectification unit, except for a small purge stream which was recycled to the crude feed stream so as to purge residual low boilers from the rectification unit. Thus, the gross heat input to the rectification unit was employed to distill and reboil in the extractive distillation unit as well as the rectification unit.

The procedure of Example II resulted in a total steam consumption at 212° F. of only 8 pounds per gallon of refined methanol, while the procedure of Example I consumed a total of 12 pounds of steam per gallon of refined methanol. It is evident that substantial heat economies are thus attained by operation of the rectification unit at elevated pressure, in accordance with FIGURE II and Example II. However, although this modification is a preferred embodiment of the present invention, it will be evident that equipment cost is somewhat higher, and thus economic factors will dictate selection of a specific process combination in any particular installation.

Various other alternatives will occur to those skilled in the art. As described supra, the rectification unit may be operated with direct injection of heating steam into the bottoms rather than by use of a separate heating coil. This modification naturally reduces equipment cost, however in some cases the process steam may contain objectionable impurities which thus would be introduced into the process streams. It will be evident that direct injection of steam will necessitate an increase in the rate of withdrawal of liquid water bottoms from the rectification unit.

Various other alternatives, such as heat exchange between process streams for purposes of heat conservation, will occur to those skilled in the art.

What I claim is:

1. A process for the purification of crude synthetic methanol containing low boiling and high boiling organic impurities which comprises introducing the crude feed stream into the middle region of a distillation zone, said middle region having a proportion of high boilers relative to methanol in the liquid phase which is substantially greater than in the crude feed, admitting water into the upper portion of said zone whereby extractive distillation of low boilers and part of the high boilers takes place, removing an overhead vapor stream from said zone comprising low boilers, part of the high boilers, methanol, and water vapor, withdrawing a liquid side stream from said middle region, diluting said side stream with water whereby a separate and water-immiscible liquid layer comprising high boilers is formed, separating said immiscible liquid layer from the residual aqueous side stream, recycling said residual aqueous side stream to said middle region, and withdrawing from the bottom of said zone a product stream comprising aqueous methanol solution of lowered impurity content.

2. The process of claim 1, in which said side stream withdrawn from said middle region is formed by combining at least two separate side drawoff streams from different sections of said middle region, one of said side drawoff streams being derived from a section above the inlet section where said crude feed is introduced into said middle region, and one other of said side drawoff streams being derived from a section below said inlet section.

3. The process of claim 1, in which said residual aqueous side stream is combined with said crude feed stream, and the resulting combined stream is thereafter introduced into said middle region.

4. A process for the purificatoin of crude synthetic methanol containing low boiling and high boiling organic impurities which comprises introducing the crude feed stream at a temperature in the range of 160° F. to 200° F. into the middle region of a distillation zone, said middle region having a concentration of high boilers relative to methanol in the liquid phase in the proportion of 50% to 200%, admitting water into the upper portion of said zone at a temperature in the range of 85° F. to 125° F., whereby extractive distillation of low boilers and part of the high boilers takes place, removing an overhead vapor stream from said zone comprising low boilers, part of the high boilers, methanol, and water vapor, withdrawing a liquid side stream from said middle region, cooling said side stream to a temperature in the range of 75° F. to 140° F., diluting said side stream with water to provide a water concentration in the range of 50% to 90% whereby a separate and water-immiscible liquid layer comprising high boilers is formed, separating said immiscible liquid layer from the residual aqueous side stream, recycling said residual aqueous side stream to said middle region, and withdrawing from the bottom of said zone a product stream comprising aqueous methanol solution at a temperature of about 180° F. to 220° F. and having a methanol content in the range of 8% to 40%, said product stream being free of a major portion of said impurities.

5. The process of claim 4, in which the aqueous liquid phase in said distillation zone is maintained at an alkaline pH in the range of from 7.5 to 9.5.

6. The process of claim 5, in which said zone is maintained at said alkaline pH level by the addition of an alkaline agent to said water stream admitted into the upper portion of said distillation zone.

7. The process of claim 6, in which said alkaline agent is sodium hydroxide.

8. A process for the production of substantially pure anhydrous methanol from crude synthetic methanol containing low boiling and high boiling organic impurities which comprises introducing the crude feed stream into the middle region of a first distillation zone, said middle region having a proportion of high boilers relative to methanol in the liquid phase which is substantially greater than in the crude feed, admitting water into the upper portion of said first zone whereby extractive distillation of low boilers and part of the high boilers takes place, removing an overhead vapor stream from said first zone comprising low boilers, part of the high boilers, methanol, and water vapor, withdrawing a side stream from said middle region, diluting said side stream with water whereby a separate and water-immiscible liquid layer comprising high boilers is formed, separating said immiscible liquid layer from the residual aqueous side stream, recycling said residual aqueous side stream to said middle region of said first zone, withdrawing from said first zone a bottoms stream of aqueous methanol solution containing only minor residual amounts of said impurities, introducing said bottoms stream into the middle section of a second distillation zone whereby said bottoms stream is stripped and rectified, withdrawing a liquid side stream from said middle section and recycling said side stream to the middle region of said first distillation zone, said side stream comprising aqueous methanol solution containing substantially all of the residual high boilers derived from said bottoms stream, withdrawing a bottoms stream from said second distillation zone comprising water substantially free of methanol, removing an overhead vapor stream from said second zone comprising methanol together with substantially all of the residual low boilers derived from said bottoms stream, cooling and condensing said overhead vapor stream, refluxing a portion of the resulting liquid overhead stream to the upper part of said second zone, recycling the balance of said overhead liquid stream to said middle region of said first distillation zone, and withdrawing a liquid product stream comprising a substantially pure anhydrous methanol from the upper portion of said second distillation zone.

9. A process for the production of substantially pure anhydrous methanol from crude synthetic methanol containing low boiling and high boiling organic impurities which comprises introducing the crude feed stream into a first distillation zone, admitting water into the upper portion of said first zone whereby extractive distillation of said organic impurities takes place and a bottoms stream is produced comprising dilute aqueous methanol containing only minor residual amounts of said impurities, introducing said bottoms stream into the middle section of a second distillation zone, whereby said bottoms stream is stripped and rectified, withdrawing a liquid side stream from said middle section and recycling said side stream to said first distillation zone, said side stream comprising aqueous methanol solution containing substantially all of the residual high boilers derived from said bottoms stream, withdrawing a bottoms stream from said second distillation zone comprising water substantially free of methanol, removing an overhead vapor stream from said second zone comprising methanol together with substantially all of the residual low boilers derived from said aqueous methanol bottoms stream, cooling and condensing said overhead vapor stream, refluxing a portion of the resulting condensed liquid stream to the upper part or said second zone, recycling the balance of said condensed liquid stream to said first distillation zone, and withdrawing a liquid product stream comprising substantially pure anhydrous methanol from the upper portion of said second distillation zone.

10. The process of claim 9, in which said side stream withdrawn from said middle section in the second distillation zone is formed by combining at least two separate side drawoff streams from different regions of said middle section, one of said side drawoff streams being derived from a region above the entry point where said bottoms stream is introduced into said middle section, and one other of said side drawoff streams being derived from a region below said entry point.

11. The process of claim 9, in which said side stream recycled to said first distillation zone, and the portion of said resulting liquid overhead stream which is also recycled to said first distillation zone, are first combined with said crude feed stream, and the resulting combined stream is thereafter introduced into said first distillation zone.

12. A process for the production of substantially pure anhydrous methanol from crude synthetic methanol containing low boiling and high boiling organic impurities which comprises introducing the crude feed stream at a temperature in the range of 160° F. to 200° F. into a first distillation zone, admitting water into the upper portion of said zone at a temperature in the range of 85° F. to 125° F., whereby extractive distillation of said organic impurities takes place and a bottoms stream is produced at a temperature of about 180° F. to 220° F., said bottoms stream comprising aqueous methanol solution having a methanol content in the range of 8% to 40% and containing only minor residual amounts of said impurities, heating said bottoms stream to a temperature in the range of 205° F. to 220° F., introducing said bottoms stream into the middle section of a second distillation zone, whereby said bottoms stream is stripped and rectified, withdrawing a liquid side stream at a temperature in the range of 165° F. to 180° F. from said middle section and recycling said side stream to said first distillation zone, said side stream comprising aqueous methanol solution containing substantially all of the residual high boilers derived from said bottoms stream, withdrawing a bottoms stream comprising water at a temperature in the range of 215° F. to 260° F. and substantially free of methanol from said second distillation zone, removing an overhead vapor stream at a temperature of about 145° F. to 150° F. from said second zone, said overhead vapor stream comprising methanol together with substantially all of the residual low boilers derived from said aqueous methanol bottoms stream, cooling and condensing said overhead vapor stream, refluxing a portion of the resulting liquid overhead stream to the upper part of said second zone, recycling the balance of said overhead liquid stream to said first distillation zone, and withdrawing a liquid product stream comprising substantially pure anydrous methanol at a temperature of about 148° F. from the upper portion of said second distillation zone.

13. A process for the production of substantially pure anhydrous methanol from crude synthetic methanol containing low boiling and high boiling organic impurities which comprises introducing the crude feed stream into a first distillation zone, admitting water into the upper portion of said first zone whereby extractive distillation of said organic impurities takes place and a bottoms stream is produced comprising dilute aqueous methanol containing only minor residual amounts of said impurities, introducing said bottoms stream into the middle section of a second distillation zone maintained at superatmospheric pressure, whereby said bottoms stream is stripped and rectified, withdrawing a liquid side stream from said middle section and recycling said side stream to said first distillation zone, said side stream comprising aqueous methanol solution containing substantially all of the residual high boilers derived from said bottoms stream, withdrawing a bottoms stream from said second distillation zone comprising water substantially free of methanol, removing an overhead vapor stream from said second zone comprising methanol together with substantially all of the residual low boilers derived from said aqueous methanol bottoms stream, cooling and condensing said overhead vapor stream wherein said cooling step includes heat exchange with liquid bottoms in said first distillation zone, whereby said liquid bottoms are reboiled, refluxing a portion of the condensed liquid derived from said overhead vapor stream to the upper part of said second zone, recycling the balance of said condensed liquid stream to said first distillation zone, and withdrawing a liquid product stream comprising substantially pure anhydrous methanol from the upper portion of said second distillation zone.

14. The process of claim 13, in which said crude feed stream is introduced into the middle region of said first distillation zone, said middle region having a proportion of high boilers relative to methanol in the liquid phase which is substantially greater than in the crude feed, an overhead vapor stream is removed from said first zone comprising low boilers, part of the high boilers, methanol, and water vapor, a side stream is withdrawn from said middle region and diluted with water whereby a separate and water-immiscible liquid layer comprising high boilers is formed, said immiscible liquid layer is separated from the residual aqueous side stream, and said residual aqueous side stream is recycled to said middle region of said first zone.

15. A process for the production of substantially pure anhydrous methanol from crude synthetic methanol containing low boiling and high boiling organic impurities which comprises introducing the crude feed stream at a temperature in the range of 160° F. to 200° F. into a first distillation zone, admitting water into the upper portion of said zone at a temperature in the range of 85° to 125° F., whereby extractive distillation of said organic impurities takes place and a bottoms stream is produced at a temperature of about 180° F. to 220° F., said bottoms stream comprising aqueous methanol solution having a methanol content in the range of 8% to 40% and containing only minor residual amounts of said impurities, heating said bottoms stream to a temperature in the range of 250° F. to 355° F., introducing said bottoms stream into the middle section of a second distillation zone maintained at superatmospheric pressure in the range of 20 p.s.i.g. to 170 p.s.i.g., whereby said bottoms stream is stripped and rectified, withdrawing a liquid side stream at a temperature in the range of 210° F. to 315° F. from said middle section and recycling said side stream to said first distillation zone, said side stream comprising aqueous methanol solution containing substantially all of the residual high boilers derived from said bottoms stream, withdrawing a bottoms stream comprising water at a temperature in the range of 275° F. to 375° F. and substantially free of methanol from said second distillation zone, removing an overhead vapor stream at a temperature of about 190° F. to 295° F. from said second zone, said overhead vapor stream comprising methanol together with substantially all of the residual low boilers derived from said aqueous methanol bottoms stream, cooling and condensing said overhead vapor stream wherein said cooling step includes heat exchange with liquid bottoms in said first distillation zone, whereby said liquid bottoms are reboiled, refluxing a portion of the condensed liquid derived from said overhead vapor stream to the upper part of said second zone, recycling the balance of said condensed liquid stream to said first distillation zone, and withdrawing a liquid product stream comprising substantially pure anhydrous methanol at a temperature in the range of 190° F. to 295° F. from the upper portion of said second distillation zone.

16. A process for the production of substantially pure anhydrous methanol from crude synthetic methanol containing low boiling and high boiling organic impurities which comprises introducing the crude feed at a temperature in the range of 160° F. to 200° F. into the middle region of a first distillation zone, said middle region having a concentration of high boilers relative to methanol in the liquid phase in the proportion of 50% to 200%, admitting water into the upper portion of said first zone at a temperature in the range of 85° F. to 125° F., whereby extractive distillation of low boilers and part of the high boilers takes place, removing an overhead vapor from said first zone comprising low boilers, part of the high boilers, methanol, and water vapor, withdrawing a liquid side stream from said middle region, cooling said side stream to a temperature in the range of 75° to 140° F., diluting said side stream with water to provide a water concentration in the range of 50% to 90% whereby a separate and water-immiscible liquid layer comprising high boilers is formed, separating said immiscible liquid layer from the residual aqueous side stream, recycling said residual aqueous side stream to said middle region of said first zone, withdrawing from said first zone a bottoms stream comprising aqueous methanol solution at a temperature of about 180° F. to 220° F. and having a methanol content in the range of 8% to 40%, said bottoms stream being free of a major portion of said impurities, heating said bottoms stream to a temperature in the range of 250° F. to 355° F., introducing said bottoms stream into the middle section of a second distillation zone maintained at superatmospheric pressure in the range of 20 p.s.i.g. to 170 p.s.i.g., whereby said bottoms stream is stripped and rectified, withdrawing a liquid side stream at a temperature in the range of 210° F. to 315° F. from said middle section and recycling said side stream to said first distillation zone, said side stream comprising aqueous methanol solution containing substantially all of the residual high boilers derived from said bottoms stream, withdrawing a bottoms stream comprising water at a temperature in the range of 275° F. to 375° F. and substantially free of methanol from said second distillation zone, removing an overhead vapor stream at a temperature of about 190° F. to 295° F. from said second zone, said overhead vapor stream comprising methanol together with substantially all of the residual low boilers derived from said aqueous methanol bottoms stream, cooling and condensing said overhead vapor stream wherein said cooling step includes heat exchange with liquid bottoms in said first distillation zone, whereby said liquid bottoms are reboiled, refluxing a portion of the condensed liquid derived from said overhead vapor stream to the upper part of said second zone, recycling the balance of said condensed liquid stream to said first distillation zone, and withdrawing a liquid product stream comprising substantially pure anhydrous methanol at a temperature in the range of 190° F. to 295° F. from the upper portion of said second distillation zone.

References Cited by the Examiner

UNITED STATES PATENTS

| | | | |
|---|---|---|---|
| 2,442,011 | 5/1948 | Legatski | 202—40 |
| 2,549,290 | 4/1951 | Congdon et al. | |
| 2,575,244 | 11/1951 | Carlson et al. | 202—39.5 |
| 2,586,602 | 2/1952 | Beddow | 260—643 |
| 2,638,440 | 5/1953 | Drout et al. | 202—39.5 |
| 2,647,078 | 7/1953 | Chambers | 202—39.5 |
| 2,806,816 | 9/1957 | Staib et al. | 202—39.5 |
| 2,865,818 | 12/1958 | Hawkins et al. | 202—39.5 |
| 2,993,840 | 7/1961 | Poincet | 202—40 X |

FOREIGN PATENTS 660,773  11/1951  Great Britain.

OTHER REFERENCES

Technique of Organic Chemistry IV Distillation, Weissberger Interscience Publish Inc., N.Y., 1951 (p. 366 relied on).

NORMAN YUDKOFF, *Primary Examiner.*

ALPHONSO G. SULLIVAN, *Examiner.*